Patented Aug. 30, 1927.

1,640,975

UNITED STATES PATENT OFFICE.

RALPH L. BROWN, OF PITTSBURGH, PENNSYLVANIA.

PROCESS OF RECOVERING STYRENE.

No Drawing.    Application filed November 10, 1922.  Serial No. 600,027.

The present invention relates to the recovery of styrene and more particularly to the recovery of styrene from drip oil, although the process is applicable to the recovery of styrene from other sources.

Drip oil is the term applied to the oil which appears as a natural condensate in the distributing system or gas mains carrying manufactured gas as supplied for illumination and domestic heating purposes.

Under the operating conditions employed in the usual public service gas plants at the present time, and particularly those manufacturing carburetted water gas or mixtures of that gas with other combustible gases, the drip oil consists of approximately 50% of so-called unsaturated hydrocarbons, principally indene and styrene in about equal proportions. The remainder of the drip oil is made up largely of saturated hydrocarbons such as benzene, toluene, the xylenes and their homologues. There also appear comparatively small and varying amounts of paraffin and other hydrocarbons and traces of certain oxygen-bearing compounds.

I have found that the drip oil contains a recoverable amount of styrene and that it may be separated from the other constituents of the drip oil by the following process.

My process may be briefly outlined as follows. The drip oil is first distilled to separate the styrene and fractions having substantially the same or lower boiling points from the higher boiling point fractions. In this way, styrene, benzene, toluene and xylenes are separated from the higher boiling point indene and tarry matter. The distillate is refractionated to separate the styrene and xylenes which have near boiling points from the benzene and toluene which have lower boiling points. The styrene is then converted into a form in which it may be separated from the xylenes. This is preferably done by converting the styrene into a relatively non-volatile form such as by polymerizing it into meta-styrene or treating with a halogen to form a non-volatile halogen addition product.

For example,

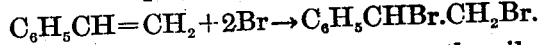

$$C_6H_5CH=CH_2 + 2Br \rightarrow C_6H_5CHBr.CH_2Br.$$

The styrene is then separated from the oils, preferably by distilling off the oils, these being more volatile than the form in which styrene has been converted. The styrene is thereafter de-polymerized in the case of meta-styrene, or the halogen addition product in which the styrene was converted may thereafter be reconverted into styrene.

The recovered styrene among other purposes is useful as a starting point for many chemicals employed in the various arts and industries, and may serve as an intermediate in the dye, perfume, flavor and perfumed soap industries.

The process is described specifically as follows with particular reference to the treatment of drip oil.

The drip oil is first distilled, distillation being carried up to a vapor temperature of about 170° C. The residue left in the still consists of a gummy solution containing polymerization products of various unsaturated hydrocarbons together with the indene, which has a boiling point of 182° C., and will, therefore, remain behind with the residue. The distillate consists largely of the styrene together with saturated hydrocarbons falling within the benzene, toluene and xylene fractions.

The distillate is refractionated to further isolate the styrene. The fraction boiling about 115° to 120° up to 170° C. and which consists principally of styrene, the xylenes and probably a small quantity of ethyl-benzene and similar homologues, together with possible traces of stilbene and allied hydrocarbons, is separated from the lower boiling point fractions containing benzene and toluene.

The styrene is separated from the xylenes by converting the styrene into relatively non-volatile form and distilling off the more volatile oils, such as the xylenes. The transformation of the styrene into non-volatile form is preferably accomplished by polymerization. The polymerization may be carried out in various ways but it is preferable to polymerize the styrene by treating the fraction containing the styrene and the xylene with heat and pressure in an autoclave, preferably to a temperature of about 200° to 300° C. The material may be polymerized by heat alone but pressure assists in the polymerization. The presence of oxygen in contact with the material to be polymerized appears to be catalytic although it gives a slight amount of oxidation products which are, in general, negligible. Styrene may also be polymerized by photo-chemical action, that is by light. The polymerization may be carried out by chemical treatment such as treatment with acid, preferably concentrated sulphuric acid. Iodin will cause polymerization. Treatment with about 5% sodium bisulphite will also cause polymerization.

Polymerization by heat preferably accompanied by pressure is, however, to be preferred as it does not leave traces of impurities in the meta-styrene.

The styrene itself is a colorless liquid in many ways resembling the xylenes or toluene. It boils at 146° C. It is an unsaturated hydrocarbon having the formula

$$C_6H_5.CH=CH_2$$

The polymerization transforms it into a form usually known as meta-styrene. The exact number of structural molecules in meta-styrene is not known but it has been conjectured that meta-styrene consists of 4 or 5 molecules of styrene. The meta-styrene, or meta-styrol as it is sometimes called, is a white, odorless amorphous substance. Meta-styrene begins to fuse at about 150° C. Depolymerization begins at about 150° C. and increases gently in rate up to about 200° C. From 200° to 300° the depolymerization begins to be marked and from 300° to 320°, or even perhaps a little higher when the meta-styrene is not entirely pure, depolymerization is most rapid. The depolymerized styrene comes off as a vapor and is condensed and collected as a liquid.

Meta-styrene is soluble in benzene and its homologues or mixtures of them. A 50% solution of meta-styrene in one of these solvents is of a gelatinous consistency. A solution of about 80% meta-styrene in benzene or one of its homologues is resinous in character and is quite hard unless the temperature is raised.

The styrene may be converted into separable forms other than meta-styrene. For example, the fraction containing the styrene may be treated with halogen at a temperature preferably around −10 to −20° C. At this temperature practically none or negligible amounts of substitution products occur. The halogen combines with the styrene to form addition products known as dihalides. These products are either solid or liquid and are relatively non-volatile so that the more volatile oils, such as the xylenes, may be distilled off from the dihalides of styrene. Chlorine or bromine are preferably the halogens used. The halogen acids may also be used and produce liquid addition products with the styrene.

The xylenes and other benzene homologues present in the fraction treated are next separated from the product in which the styrene is converted. This separation is preferably carried out by distillation, the more volatile oils being distilled off from the relatively non-volatile styrene product. The distillation may be carried out either direct or by the use of steam or under diminished pressure. This distillation leaves a residue of reasonably pure meta-styrene, styrene dihalide or other form in which the styrene was converted.

In cases where the styrene was converted into meta-styrene, the meta-styrene is next preferably reconverted into styrene by depolymerization. The depolymerization may be effected by the direct application of heat. The meta-styrene at about 150° C. begins to appreciably depolymerize, probably into the original styrene molecules, which pass over as a distillate. The depolymerized styrene may be removed by steam distillation as well as direct distillation.

In case the styrene was converted to one of the halogen addition products, the halogen may be removed by the use of a zinc-mercury couple, an aluminum-mercury couple, or a similar couple, used in conjunction with an alcohol solution which may contain more or less water. The couple in the presence of alcohol will remove the halogens, as will be readily understood by anyone skilled in this art.

The process is carried out economically, and at the present price of drip oil makes possible the production of styrene at a comparatively low cost. The styrene produced is reasonably pure and suitable for many uses in the chemical, dye and flavoring industries.

While I have specifically described the preferred manner of carrying out my process, it is to be understood that the process is not limited to the described details of procedure but may be otherwise carried out within the scope of the invention as defined in the following claims.

I claim:

1. The process of recovering styrene from carburetted water gas drip oil, comprising fractionating the drip oil to separate the styrene together with oils having boiling points near the boiling point of styrene, converting the styrene into relatively non-volatile form, and separating the volatile oils therefrom by distillation.

2. The process of recovering styrene from carburetted water gas drip oil, comprising separating the styrene together with oils having boiling points near the boiling point of styrene from the drip oil, converting the styrene into separable form, and separating the accompanying oils therefrom.

3. The process of recovering styrene from carburetted water gas drip oil, comprising distilling the drip oil to separate the styrene and more volatile constituents from the indene and less volatile constituents, fractionating the styrene fraction to separate the styrene, xylenes and less volatile constituents from the more volatile benzene and toluene fractions, converting the styrene into relatively non-volatile form, distilling off the xylenes and other volatile oils, and reconverting the converted styrene.

4. The process of recovering styrene from carburetted water gas drip oil, comprising distilling the drip oil to separate the styrene and more volatile constituents from the indene and less volatile constituents, fractionating the styrene fraction to separate the styrene, xylenes and less volatile constituents from the more volatile benzene and toluene fractions, polymerizing the styrene, separating the meta-styrene from the volatile oils by distillation, and depolymerizing the meta-styrene.

5. The process of recovering styrene from carburetted water gas drip oil, comprising distilling the drip oil to a vapor temperature of about 170° C. to separate the styrene and more volatile constituents from the indene and less volatile constituents, condensing the distillate, refractionating the distillate and recovering the fraction boiling from about 120° up to about 170° C. and which consists principally of styrene, together with hydrocarbons having boiling points near that of the styrene, treating this fraction so as to convert the styrene into a relatively non-volatile form while leaving the other hydrocarbons substantially unchanged, and distilling off said hydrocarbons.

In testimony whereof I have hereunto set my hand.

RALPH L. BROWN.